(12) United States Patent
Shiota

(10) Patent No.: US 7,696,815 B2
(45) Date of Patent: Apr. 13, 2010

(54) ELECTRONIC DEVICE HAVING MULTI-POWER SOURCE INTEGRATED CIRCUIT

(75) Inventor: Tetsuyoshi Shiota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/273,927

(22) Filed: Nov. 19, 2008

(65) Prior Publication Data

US 2009/0072806 A1  Mar. 19, 2009

Related U.S. Application Data

(63) Continuation of application No. PCT/JP2006/311018, filed on Jan. 6, 2006.

(51) Int. Cl.
  *H03B 1/04* (2006.01)
(52) U.S. Cl. ............... 327/592; 307/130; 324/734
(58) Field of Classification Search ......... 323/282–286, 323/222, 246, 235; 363/21.05, 21.06, 16–20; 307/130, 87; 324/73.1, 158.1, 734, 754, 324/765; 327/94, 129, 143, 534, 592
See application file for complete search history.

(56) References Cited

U.S. PATENT DOCUMENTS

| 4,184,197 A | * | 1/1980 | Cuk et al. ............. 363/16 |
| 5,404,099 A | | 4/1995 | Sahara |
| 5,410,467 A | * | 4/1995 | Smith et al. .......... 363/131 |
| 7,183,671 B2 | | 2/2007 | Kawanishi et al. |

FOREIGN PATENT DOCUMENTS

| JP | 05-108193 A | 4/1993 |
| JP | 5-291368 A | 11/1993 |
| JP | 08-122846 A | 5/1996 |
| JP | 10-200050 A | 7/1998 |
| JP | 2001-358294 A | 12/2001 |
| JP | 2002-158576 A | 5/2002 |
| JP | 2005-101325 | 4/2005 |
| JP | 2005-101522 A | 4/2005 |
| JP | 2005-109238 A | 4/2005 |

* cited by examiner

*Primary Examiner*—Rajnikant B Patel
(74) *Attorney, Agent, or Firm*—Arent Fox LLP

(57) ABSTRACT

An electronic device includes: an integrated circuit having a first circuit part, a second circuit part, a first power source line of the first circuit part, a second power source line of the second circuit part, and a coupling switch coupling the first power source line and the second power source line; a power source supply part which generates a power source to be supplied to the first and second circuit parts and which has a power source supply control circuit controlling the supply of power source to the second circuit part; and a power source control part that controls the power source supply control circuit and the coupling switch, wherein the power source control part controls the power source supply control circuit so as to supply a power source in accordance with the operating state of the second circuit part and closes the coupling switch.

10 Claims, 17 Drawing Sheets

Fig. 2
(A)
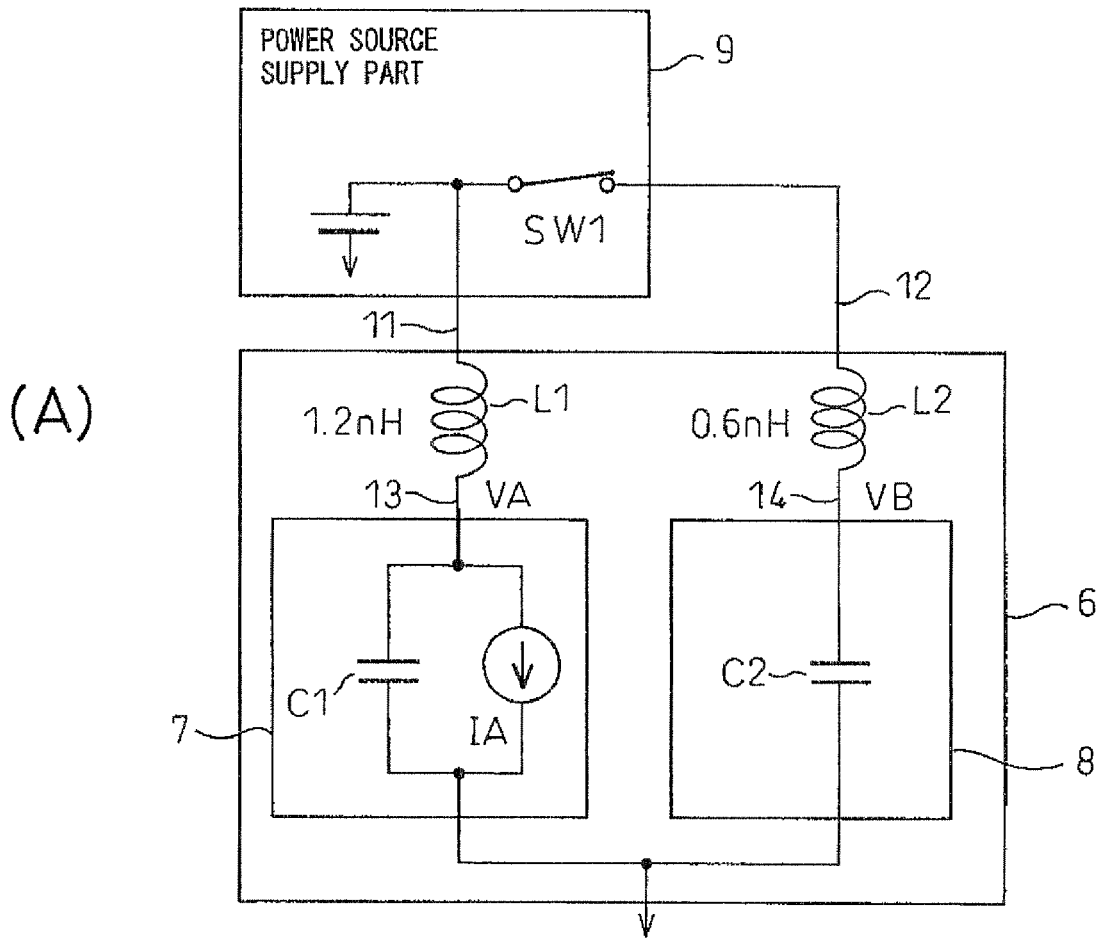
(B)
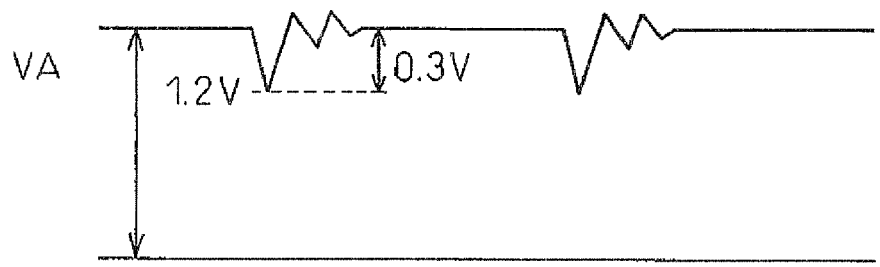

Fig.9
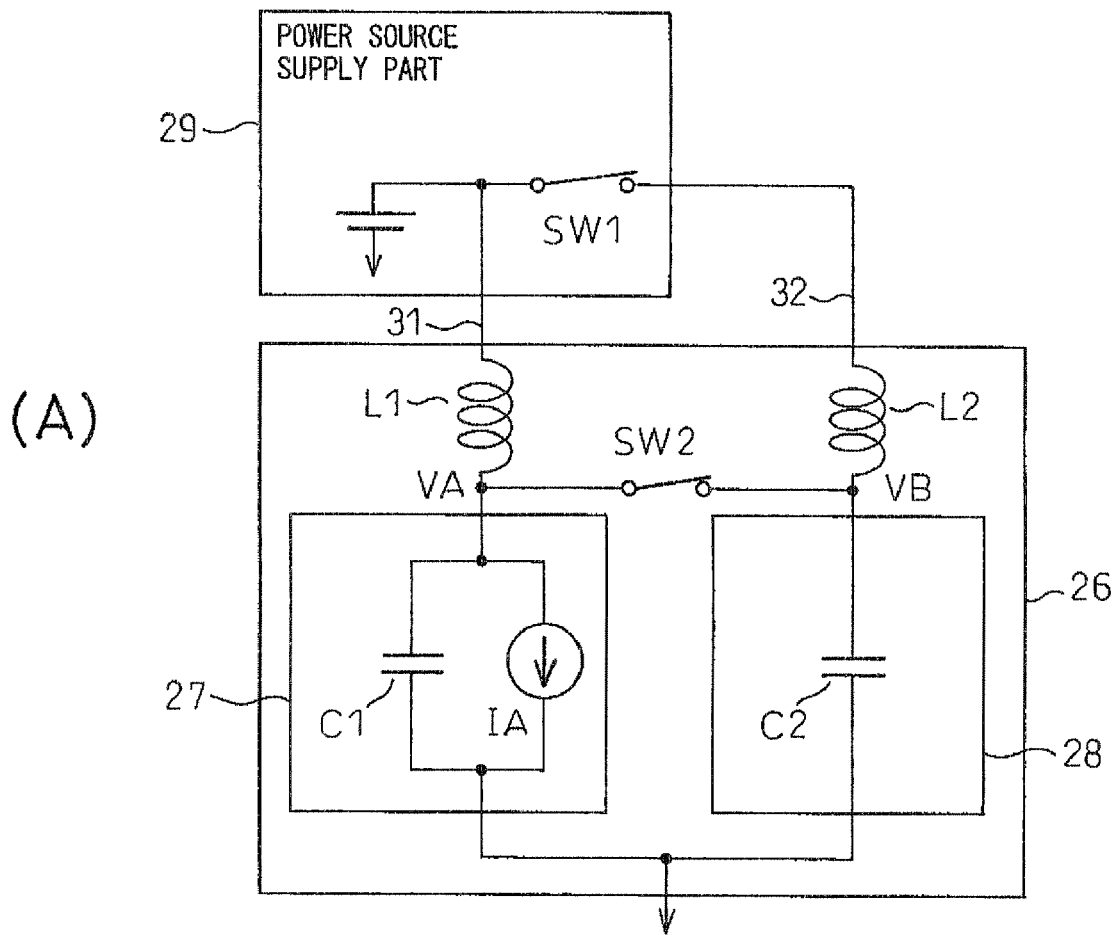
(A)
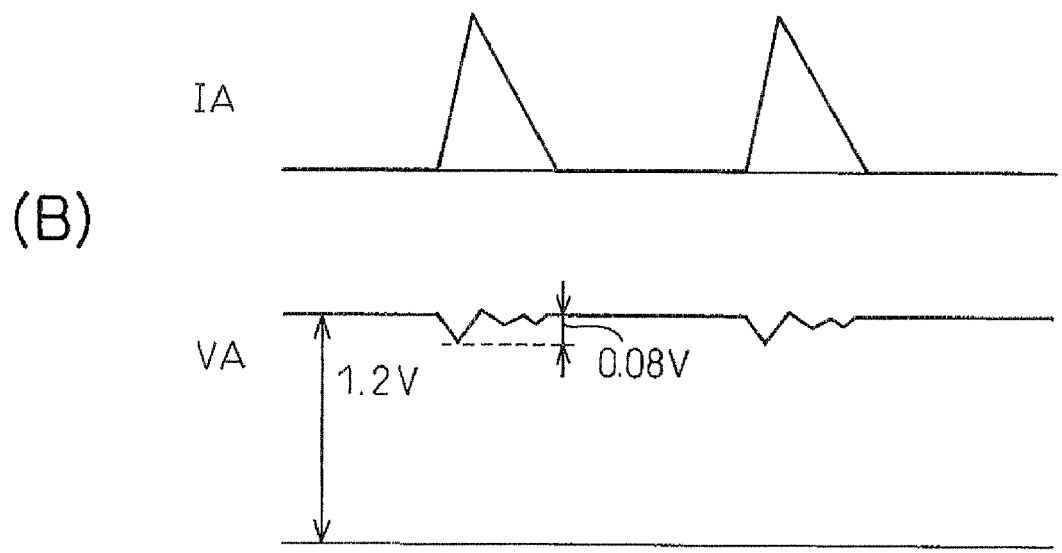
(B)

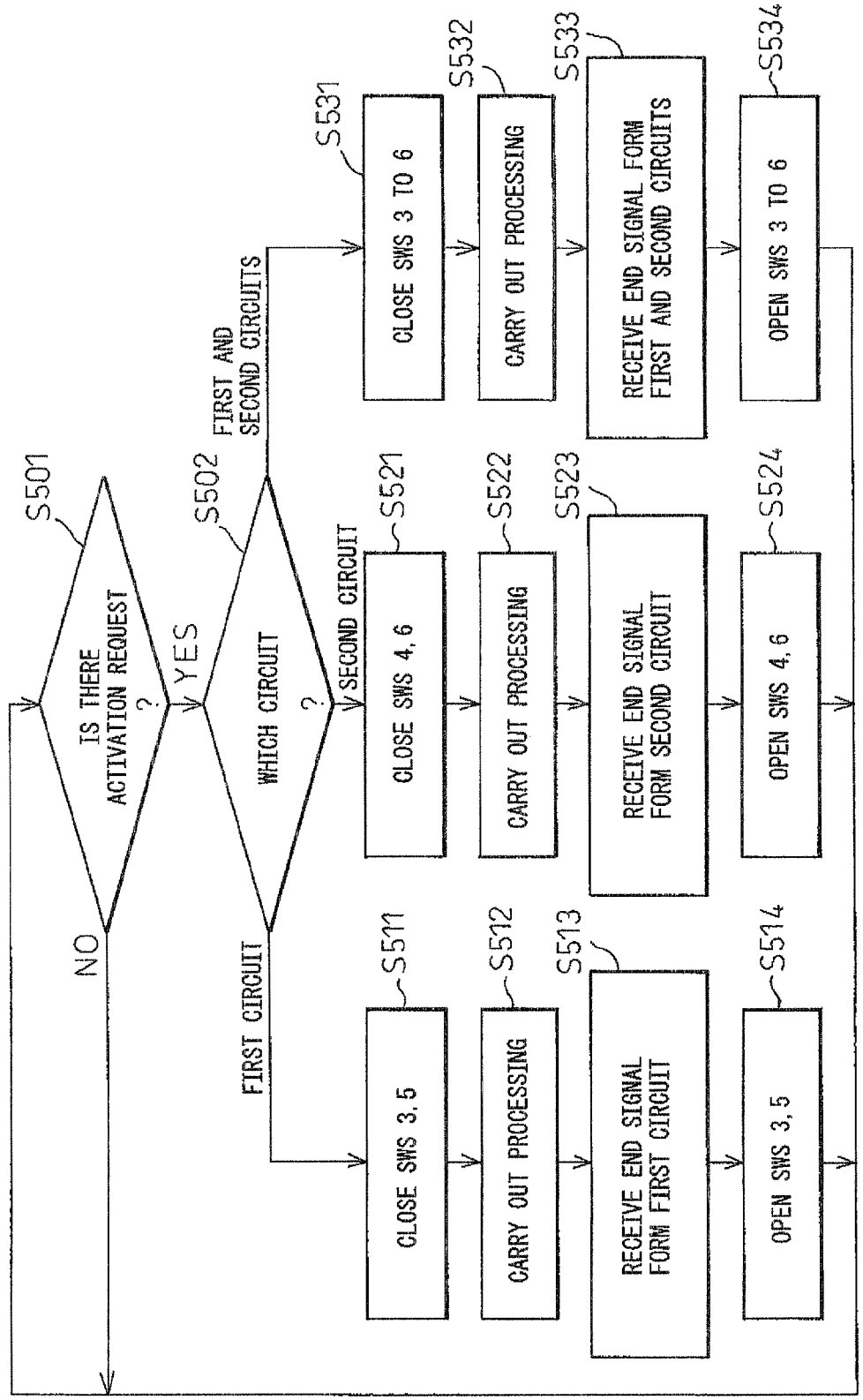

ELECTRONIC DEVICE HAVING MULTI-POWER SOURCE INTEGRATED CIRCUIT

CROSS-REFERENCE TO RELATED APPLICATIONS

This application is a Continuation application based upon an International Application Number PCT/JP2006/311018, filed on Jun. 1, 2006, the entire contents of which are incorporated herein by reference.

FIELD

The embodiments discussed herein are directed to an electronic device including a multi-power source integrated circuit (LSI) having a plurality of circuit parts.

BACKGROUND

In a transistor used in a semiconductor integrated circuit, a current (leak current) flows even in a state in which no operation is carried out, consuming electric power. Because of this, a method has been adopted, which electrically disconnects the power source of a circuit not in operation in order to reduce the leak current. FIG. 1 shows an example of a configuration of an electronic device system including a conventional image processing LSI 6. In image processing LSI 6, a first circuit part 7 and a second circuit part 8 are provided. First circuit part 7 is a memory (hereinafter, explained as SRAM), such as SRAM, to save a decryption key necessary to decode encrypted data, or a circuit, such as a timer, which is always in operation, and it is necessary for first circuit part 7 to be in an operating state or in a data holding state at all times. On the other hand, second circuit part 8 is a logic circuit for image processing etc., and is a circuit that may be put into a suspended state without the need to supply power when not in operation.

First circuit part 7 and second circuit part 8 are coupled to external power source lines 11 and 12 via internal power source lines 13 and 14 and a power source is supplied from an external power source supply part 9 via these power source lines. A low potential side power source GND is common. When second circuit part 8 is not in operation, no power source is necessary and therefore a switch SW1 is provided within power source supply part 9, which may be controlled to turn on/off by a control signal S1 from a CPU 1, and thus the supply of power source may be controlled. On the other hand, first circuit part 7 is always supplied with a power source in order to hold stored data. CPU 1 mounted on an LSI chip different from image processing LSI 6 is coupled to image processing LSI 6 and transmits image data or processing programs. CPU 1 is coupled with an operation part 4, a display part 3, and an external memory 2 via a bus 5, and thus, the transmission of data with any of the devices is enabled.

The control of SW1 by CPU1 when a user decodes image data in memory 2 and displays it on display part 3 in this system is explained. As an initial state, in first circuit part 7 of image processing LSI 6, data necessary for decode processing is saved. For example, a decryption key necessary to decode encrypted data is saved. It is assumed that SW1 is electrically disconnected (opened) because the data in second circuit part 8 does not need to be saved.

When a user presses a button of operation part 4, a control signal to instruct activation is sent from the operation part to CPU 1. CPU 1 sends power source supply control signal S1 to power source supply part 9 in order to close SW1. Upon receipt of the power source supply control signal, power source supply part 9 closes SW1. CPU 1 transfers image data and a processing program from memory 2 to first circuit part 7 of image processing LSI 6 and commands execution of the processing program. In image processing LSI 6, second circuit part 8 reads the program, the image data, and the decryption key from first circuit part 7 to carry out processing and writes image data after the processing in first circuit part 7. The image data after the processing is sent to display part 3 from first circuit part 7. When all of the processing is completed, image processing LSI 6 sends a control signal indicative of the completion of the processing to CPU 1. CPU 1 sends power source supply control signal S1 to power source supply part 9 in order to open SW1. Upon receipt of power source supply control signal S1, power source supply part 9 opens SW1.

As explained above, in an electronic circuit system having a multi-power source LSI, the circuit within the LSI is divided into a plurality of circuit parts and the supply of power source to each circuit part is carried out via distinct power lines and thus it may be possible to terminate the supply of power source from the power source supply part to a circuit part not in operation within the LSI. In order to separate the supply of power source to each circuit part, an electrode pad to be coupled to power source line 13 of first circuit part 7 and an electrode pad of the LSI package to be coupled to power source line 11 are coupled by a boding wire etc., and similarly, an electrode pad to be coupled to power source line 14 of second circuit part 8 and an electrode pad of the LSI package to be coupled to power source line 12 are coupled by a boding wire etc.

Patent document 1 (Japanese Unexamined Patent Publication (Kokai) No. H5-291368) and patent document 2 (Japanese Unexamined Patent Publication (Kokai) No. 2005-109238) describe a configuration in which the circuit within an LSI is divided into a plurality of circuit parts and the supply of power source to each circuit part is carried out via distinct power source lines. Further, patent documents 1 and 2 describe a configuration in which switches that couple a power source line of a plurality of circuit parts of an LSI to another are provided within the LSI. In this LSI, when a rated voltage is applied to the LSI, the switch is put into a state of out of conduction and normal operation is carried out and when a voltage that exceeds the rating is applied at the time of test, the switch is brought into conduction and thus the number of probes that are caused to come into contact with the electrode pad at the time of the test of LSI may be reduced.

Patent document 3 (Japanese Unexamined Patent Publication (Kokai) No. 2005-101325 describes a configuration in which a switch that couples an input terminal of an external power source of an LSI to another is provided and when a voltage that exceeds the rating, such as a surge voltage, is input, the switch is brought into conduction and thus a raise in voltage is suppressed.

However, none of patent documents 1 to 3 describe a configuration in which the supply of power source to part of the circuit within the LSI is terminated.

Patent document 1: Japanese Unexamined Patent Publication (Kokai) No. H5-291368

Patent document 2: Japanese Unexamined Patent Publication (Kokai) No. 2005-109238

Patent document 3: Japanese Unexamined Patent Publication (Kokai) No. 2005-101325

SUMMARY

According to an aspect of the embodiments, an electronic device system including: an integrated circuit having a first circuit part, a second circuit part, a first power source line of the first circuit part, a second power source line of the second circuit part, and a coupling switch that couples the first power source line and the second power source line; a power source supply part that generates and outputs a power source to be supplied to the first and second circuit parts of the integrated circuit and which has a power source supply control circuit that controls the supply of power source to the second circuit part; and a power source control part that controls the power source supply control circuit and the coupling switch, wherein the power source control part controls the power source supply control circuit so as to supply a power source in accordance with the operating state of the second circuit part, and closes the coupling switch.

Additional objects and advantages of the embodiments will be set forth in the description which follows, and in part will be obvious from the description, or may be learned by practice of the invention. The object and advantages of the embodiments will be realized and attained by means of the elements and combinations particularly pointed out in the appended claims.

It is to be understood that both the foregoing general description and the following detailed description are only exemplary and are not restrictive of the invention, as claimed.

BRIEF DESCRIPTION OF THE DRAWINGS

FIG. 2 is a diagram for explaining a problem of the configuration example of the conventional electronic device system in FIG. 1;

FIG. 9 is a diagram for explaining an effect in the system in the first embodiment;

FIG. 17 is a flowchart showing the operation in the sixth embodiment.

DESCRIPTION OF EMBODIMENTS

Before describing the embodiments, the problems of the conventional electronic device system in FIG. 1 will be described.

Figure 1:
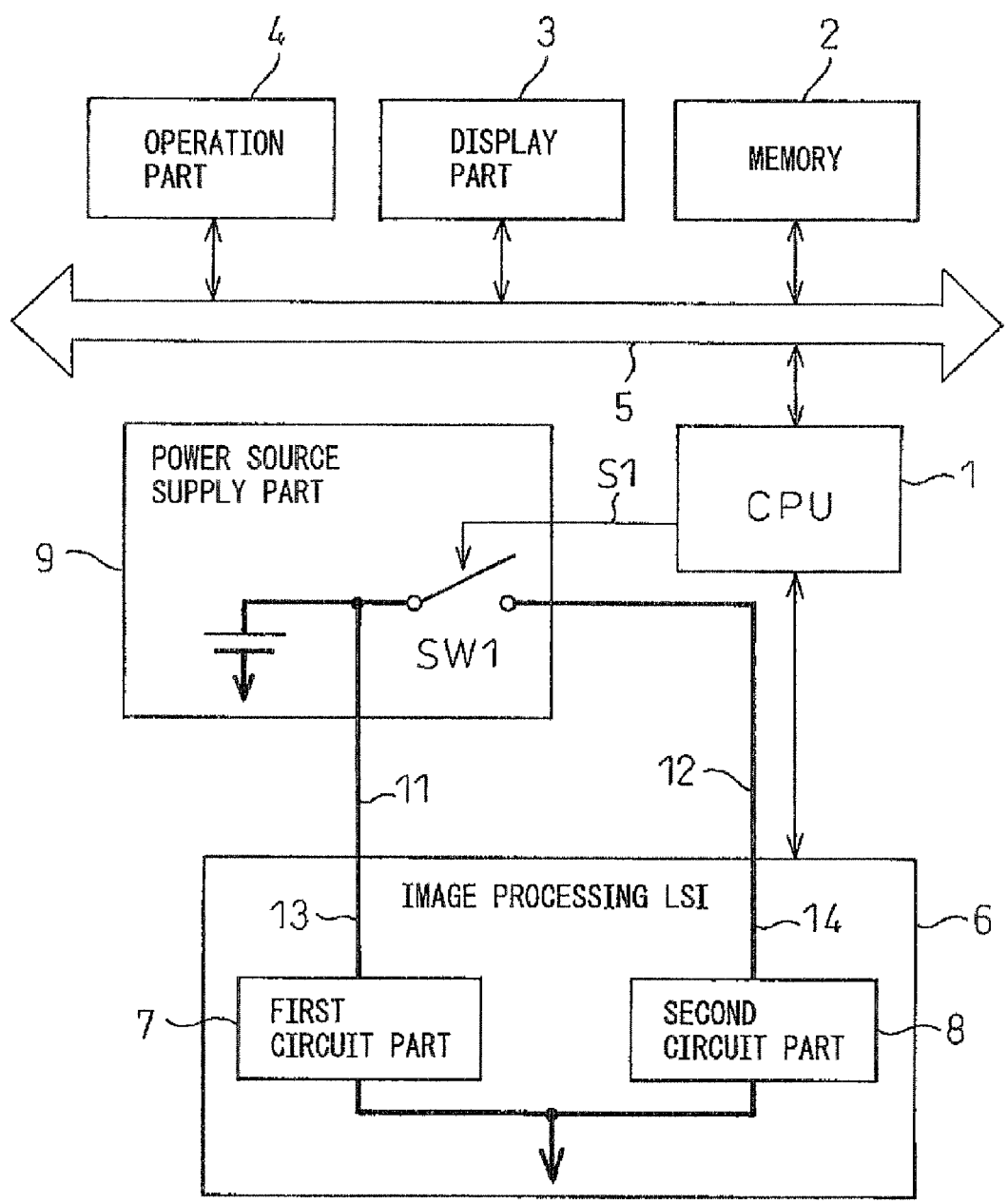
FIG. 1 is a diagram showing a configuration example of a conventional electronic device system.

FIG. 2 is a diagram explaining problems of the conventional electronic device system in FIG. 1.

In the system in FIG. 1, distinct power sources are supplied from outside to first circuit part 7 and second circuit part 8. The plurality of SRAMs constituting first circuit part 7 may be manufactured as small as possible, and therefore, a parasitic capacitance C1 of the SRAM is small. On the other hand, a capacitance C2 exists in second circuit part 8, which is a drive load. Further, as will be described later, a pulse-shaped large current IA flows in first circuit part 7, however, its average current is smaller compared to that in second circuit part 8.

As described above, the coupling of a power line between the outside and inside of the LSI is established by coupling the power source electrode pads (power source terminals) by a boding wire. The number of power source terminals of respective first circuit part 7 and second circuit part 8 is determined by the value of a current on average that flows in each part. For example, in general, when the ratio of the average current in first circuit part 7 to that in second circuit part 8 is 1:2, the ratio of the number of power source terminals of first circuit part 7 to that of second circuit part 8 is also set to 1:2.

The boding wire is a thin metal wire and has an inductance component. Because of this, when the ratio of the number of power source terminals of first circuit part 7 to that of second circuit part 8 is 1:2, the ratio of a power source inductance L1 of first circuit part 7 to that of L2 of second circuit part 8 will be 2:1. In FIG. 2, it is assumed that the ratio of the number of power source terminals of first circuit part 7 to that of second circuit part 8 is 1:2 and L1 is 1.2 nH and L2 is 0.6 nH.

In first circuit part 7, the plurality of SRAMs corresponding to the data bit width operate simultaneously and in synchronization with the edge of a clock, and therefore, the current that flows through first circuit part 7 is a wave shape having sharp peaks as shown in IA in FIG. 2(B).

As described above, in first circuit part 7, the amount of change in current is large; however capacitance value C1 is small and its inductance is large, and therefore, the variations in potential of a voltage VA at the power source node in first circuit part 7 will become large. From the result of the simulation conducted on the assumption that, for example, L1 is 1.2 nH and the operating voltage is 1.2 V, it has been found that power source voltage VA in first circuit part 7 drops in potential by as much as 0.3 V as shown in FIG. 2(B). If the power source voltage drops like this, the operating frequency of the SRAM is reduced and there arises a problem that correct reading/writing of data may be no longer possible. On the other hand, a voltage VB at the power source node of second circuit part 8 does not vary in potential as VA.

According to embodiments described hereinafter, the above-mentioned problems are solved.

Figure 3:
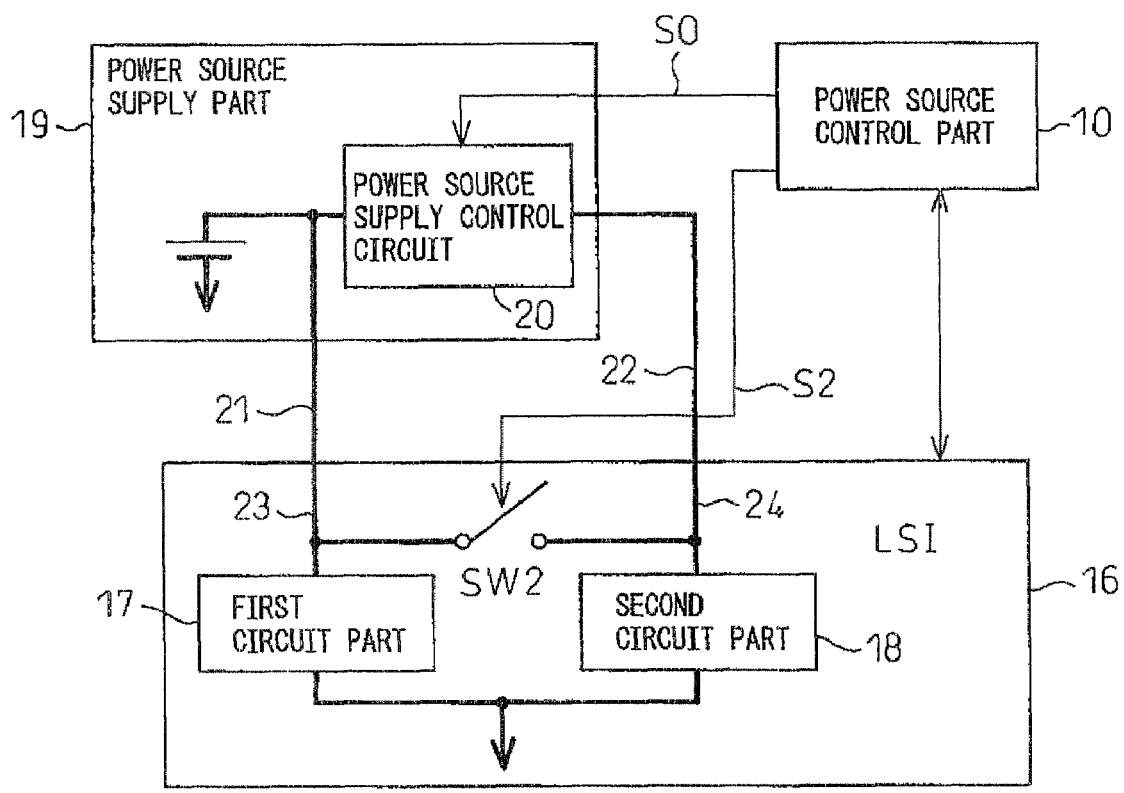
FIG. 3 is a diagram showing a first basic configuration of the embodiments.

FIG. 3 is a diagram showing a first basic configuration of an electronic device system of the embodiments.

As shown in FIG. 3, an electronic device system in a first aspect of the embodiments comprises an integrated circuit 16, a power source supply part 19, and a power source control part 10. Integrated circuit 16 has a first circuit part 17, a second circuit part 18, a first power source line 23 of first circuit part 17, a second power source line 24 of second circuit part 18, and a coupling switch SW2 that couples first power source line 23 and second power source line 24. Power source supply part 19 generates and outputs a power source to be supplied to first and second circuit parts 17, 18 of integrated circuit 16 and has a power source supply control circuit 20 that controls the supply of power source to second circuit part 18. Power source control part 10 controls power source supply control circuit 20 and coupling switch SW2 by control signals S0 and S2. In such a system, power source control part 10 controls to supply a power source from power source supply control circuit 20 in accordance with the operating state of first circuit part 17 or second circuit part 18 and at the same time, closes coupling switch SW2 to supply a power source from second source power line 24 to first circuit part 17 or from first power source line 23 to second circuit part 18.

The power source supply control circuit is, for example, a switch or a DC-DC converter.

The power source control part controls the power source supply control circuit to supply a power source when putting the second circuit part into an operating state and at the same time, controls the coupling switch to close, and when putting the second circuit part into a suspended state, the power source control part controls the power source supply control circuit not to supply a power source and at the same time, controls the coupling switch to open.

According to the first aspect of the embodiments, with the configuration in which the supply of power source to second circuit part 18 is terminated, it may be possible to supply a power source from a power source line of another system when the supply performance of power source is insufficient in first circuit part 17 or second circuit part 18.

Figure 4:
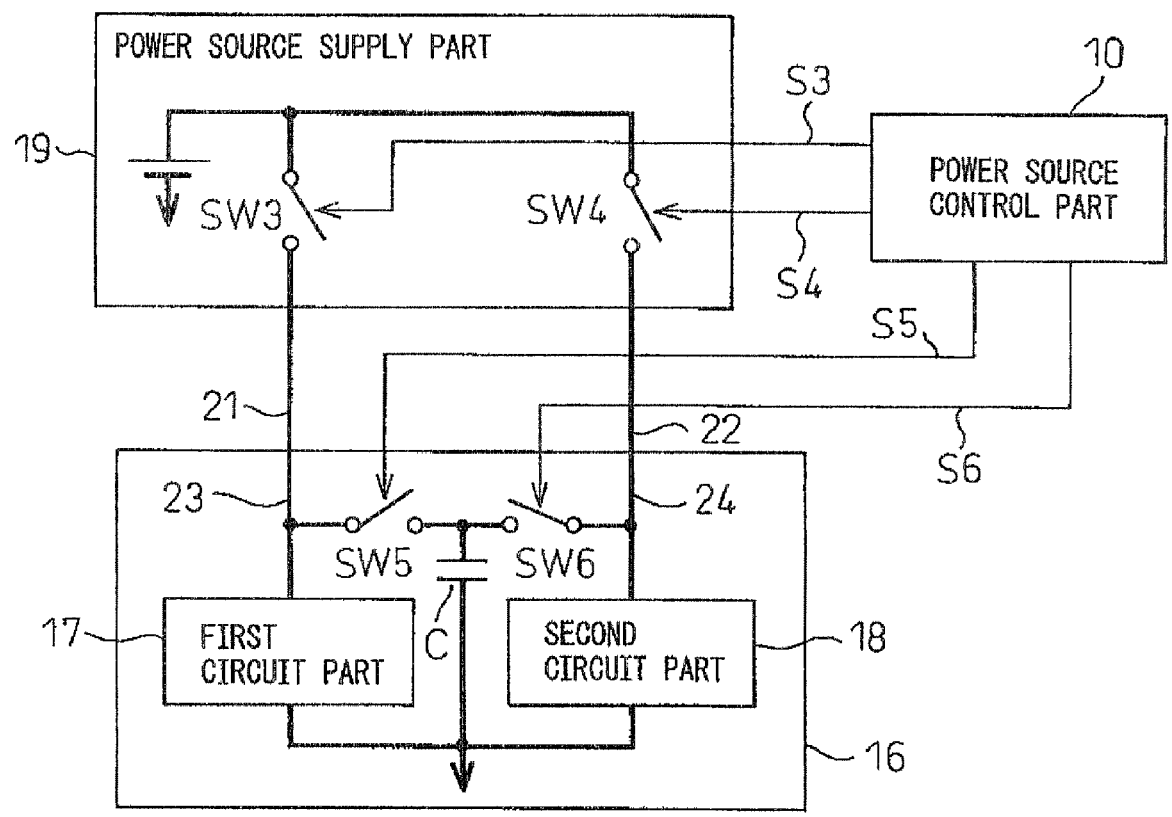
FIG. 4 is a diagram showing a second basic configuration of the embodiments.

FIG. 4 is a diagram showing a second basic configuration of an electronic device system of the embodiments.

As shown in FIG. 4, an electronic device system in a second aspect of the embodiments comprises integrated circuit 16, power source supply part 19, and power source control part 10. Integrated circuit 16 has first circuit part 17, second circuit part 18, first power source line 23 of the first circuit part, second power source line 24 of the second circuit part, a power source capacitor C, a first coupling switch SW5 that couples first power source line 23 and power source capacitor C, and a second coupling switch SW6 that couples second power source line 24 and power source capacitor C. Power source supply part 19 generates and outputs a power source to be supplied to first circuit part 17 and second circuit part 18 of integrated circuit 16, and has a first power source supply switch SW3 that controls the supply of power source to the first circuit part and a second power source supply switch SW4 that controls the supply of power source to second circuit part 18. The power source control part 10 controls first power source supply switch SW3, second power source supply switch SW4, first coupling switch SW5, and second coupling switch SW6 by control signals S3 to S6. Power source control part 10 closes first power source supply switch SW3 and first coupling switch SW5 and opens second power supply switch SW4 and second coupling switch SW6 when putting only first circuit part 17 into the operating state; closes second power source supply switch SW4 and second coupling switch SW6 and opens first power source supply switch SW3 and first coupling switch SW5 when putting only second circuit part 18 into the operating state; closes first power source supply switch SW3, second power source supply switch SW4, first coupling switch SW5, and second coupling switch SW6 when putting first circuit part 17 and second circuit part 18 into the operating state; and opens first power source supply switch SW3, second power source supply switch SW4, first coupling switch SW5, and second coupling switch SW6 when putting both first circuit part 17 and second circuit part 18 into the suspended state.

Figure 5:
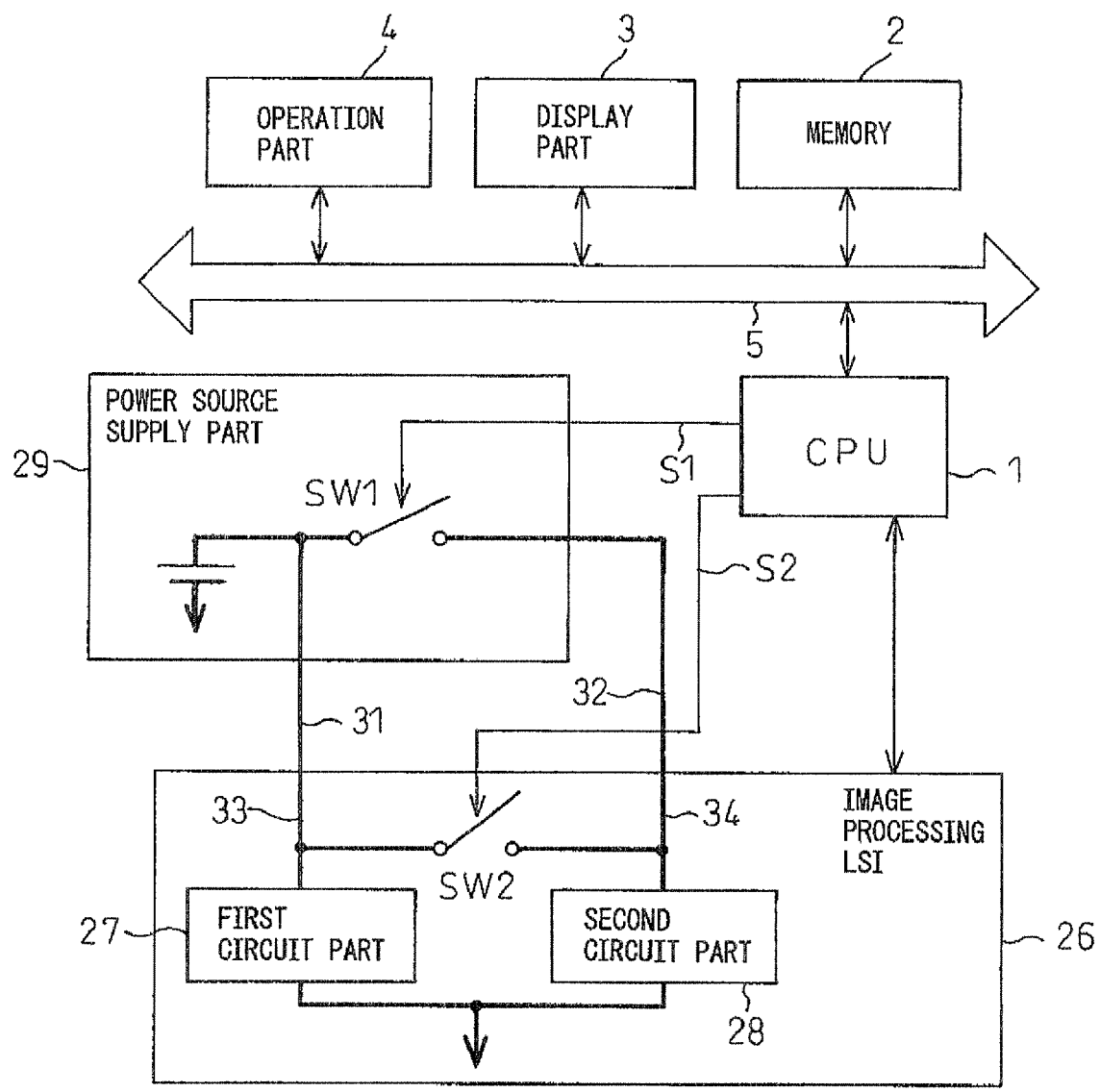
FIG. 5 is a diagram showing a configuration of an electronic device system in a first embodiment.

FIG. 5 is a diagram showing a configuration of an electronic device system in a first embodiment. This configuration differs from the configuration example of the conventional electronic device system shown in FIG. 1 in that switch SW2 that couples a first power source line 33 and a second power source line 34 is provided within an image processing LSI 26.

As shown in FIG. 5, the electronic device system in the first embodiment has a computer system including CPU (Central Processing Unit) 1, memory 2, display part 3, operation part 4, and bus 5 that couples these components. In the electronic device system in the first embodiment, image processing LSI 26 coupled to CPU 1 and a power source supply part 29 that supplies a power source to image processing LSI 26 are provided. Various other components, such as a unit that supplies a power source to CPU 1, memory 2, display part 3, and operation part 4, are provided, however, these components do not relate to the embodiment directly and therefore are omitted.

Image processing LSI 26 is provided with a first circuit part 27, a second circuit part 28, first power source line 33 of first circuit part 27, second power source line 34 of second circuit part 28, and switch SW2 that couples first power source line 33 and second power source line 34. First circuit part 27 is provided with a circuit, for example, a timer circuit, in addition to SRAM, which needs to be always in operation and therefore which needs to be always supplied with a power source. Second circuit part 28 is provided with a circuit, for example, a logic circuit including a decode circuit for image processing, the supply of power source to which is terminated in the suspended state. Low potential side power source GND is common.

Power source supply part 29 is provided with a part that generates a power source to be supplied to first circuit part 27 and second circuit part 28 of the image processing LSI and power source supply control switch SW1. The generated power source is supplied to image processing LSI 26 via a first external power source line 31 and at the same time, is supplied from the output terminal of power source supply control switch SW1 to image processing LSI 26 via a second external power source line 32. Switches SW1 and SW2 are controlled by control signals S1 and S2 from CPU 1. Consequently, CPU corresponds to power source control part 10 in FIG. 3.

Figure 6:
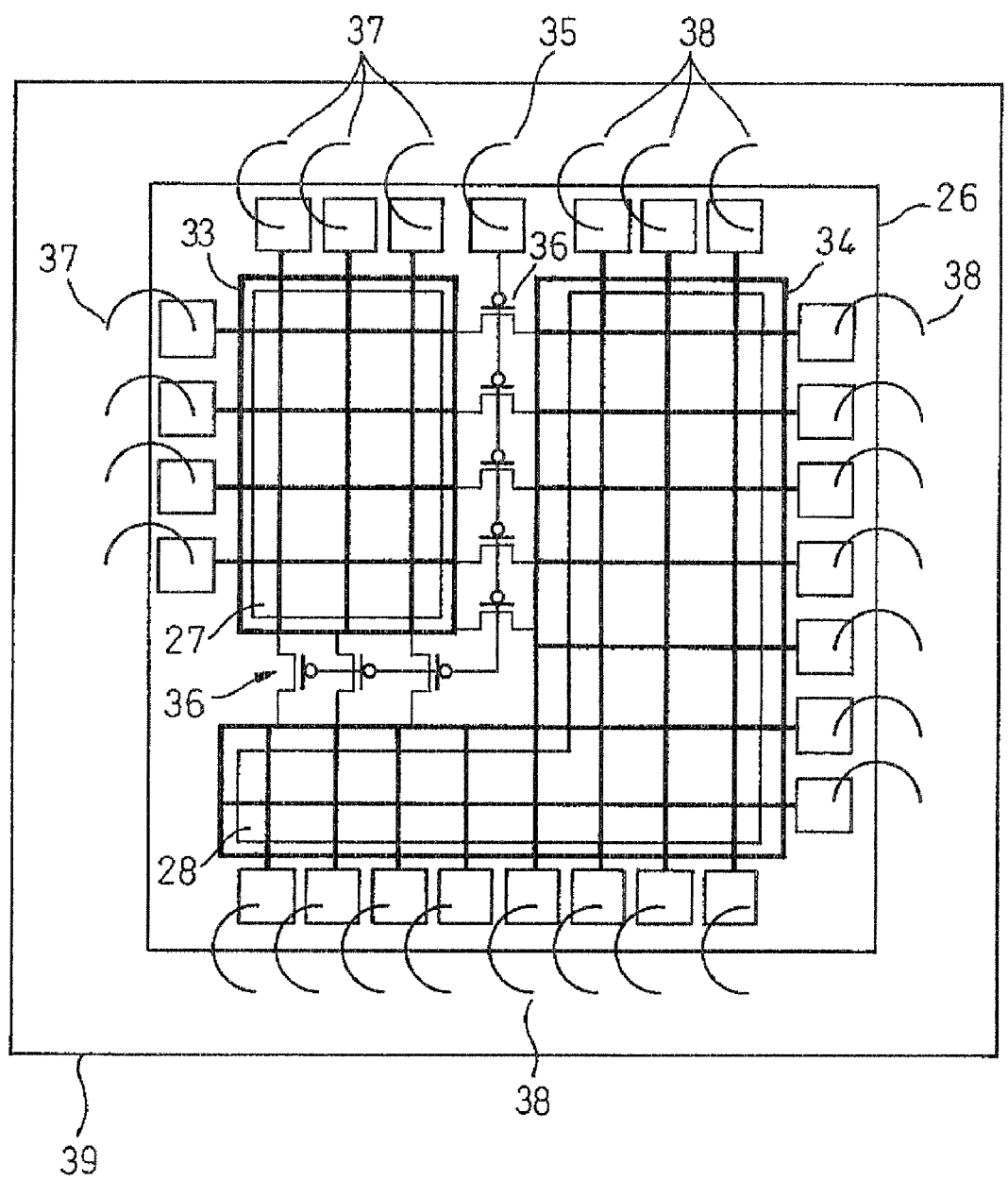
FIG. 6 is a diagram showing power source wiring lines within an LSI in the first embodiment.

FIG. 6 is a diagram showing the power source wiring of image processing LSI 26 in the first embodiment. As shown in FIG. 6, image processing LSI 26 is provided on a board 39, such as a printed board in a package. First power source lines 33 of first circuit part 27 and second power source lines 34 of second circuit part 28 are formed independently in the form of distinct meshes of wiring lines from the pads coupled by bonding wires and are coupled via PMOS transistors 36. In the state in which SW1 of power source supply part 29 is opened and the supply of power source to second power source line 34 is terminated, if the potential of control signal S2 is set to the same potential as that of first power source line 33, the source-gate voltage of PMOS transistor 36 becomes 0 V, and therefore, PMOS transistor 36 enters the OFF state. Because of this, second circuit part 28 is not supplied with power source from anywhere and the potential reduces and the leak current is reduced. That is, if PMOS transistor 36 is turned off, first power source line 33 and second power source line 34 are cut off. On the other hand, in the state in which SW1 of power source supply part 29 is closed and second power source line 34 is supplied with power source, if control signal 92 is turned to the low level, PMOS transistor 36 turns on and a state is brought about in which first power source line 33 and second power source line 34 are put conduction.

First power source line 33 is coupled to the electrode pad and coupled to first external power source line 31 on board 39 via a boding wire 37. Similarly, second power source line 34 is coupled to the electrode pad and coupled to second external power source line 32 on board 39 via boding wire 38. The gate of PMOS transistor 36 is coupled to the electrode pad and coupled to the signal line of signal S2 on board 39 via a bonding wire 35. The bonding wire is a thin metal line and has an inductance component. As shown schematically, first power source line 33 and second power source line 34 are coupled to a plurality of electrode pads and the bonding wires the number of which corresponds to the number of electrode pads are used, and therefore, the inductance of first power source line 33 and second power source line 34 is determined by the number of boding wires, that is, the number of electrode pads. In order to reduce the inductance, it is necessary to increase the number of boding wires, that is, the number of electrode pads, however, the area of LSI is limited and the numbers are determined by the value of an average current that flows in first circuit part 27 and second circuit part 28 and, for example, when the ratio between the average currents in first circuit part 27 and second circuit part 28 is 1:2, the ratio between the numbers of electrode pads of first power source line 33 and second power source line 34 is set to 1:2.

Figure 7:
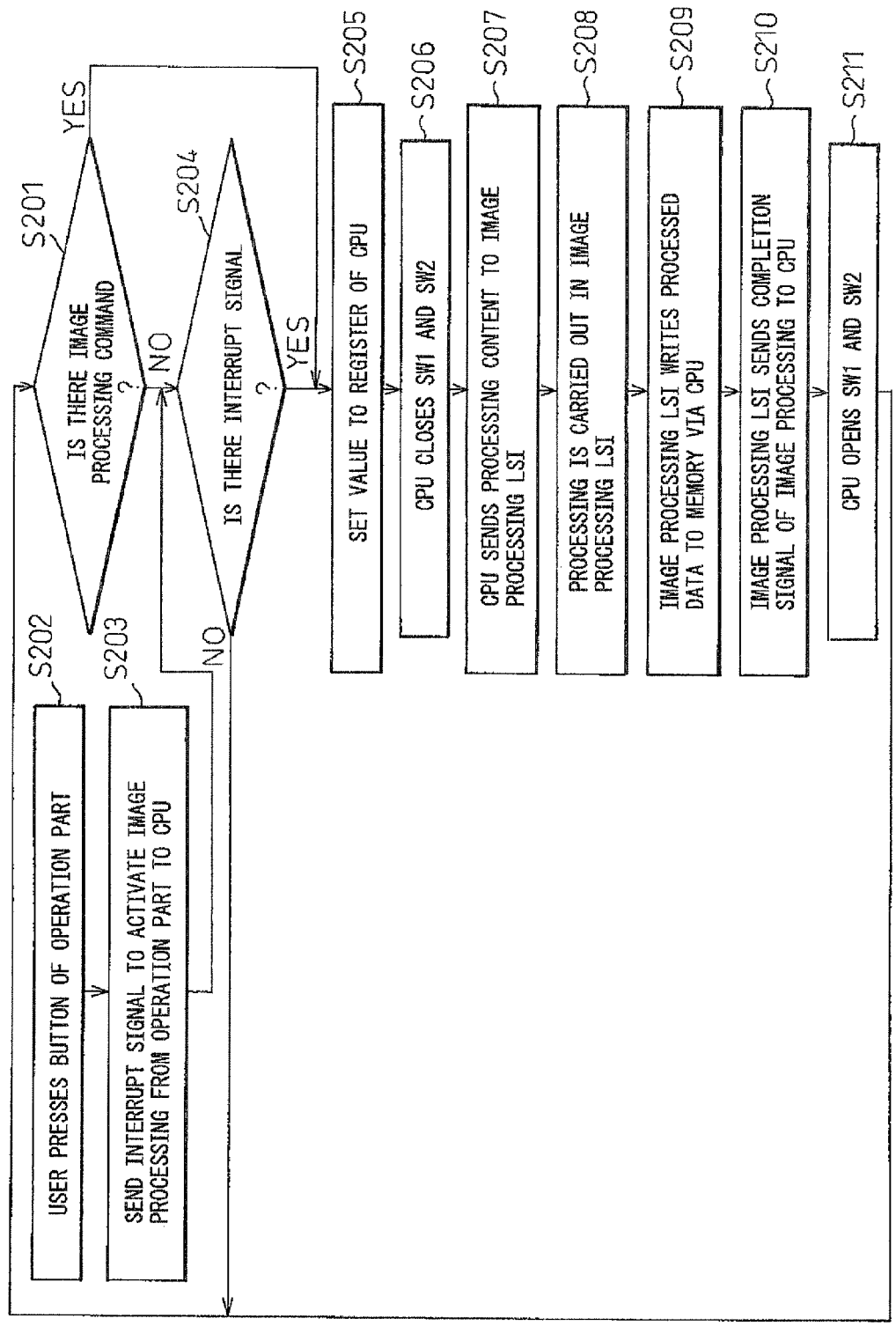
FIG. 7 is a flowchart showing the operation in the first embodiment.
Figure 8:
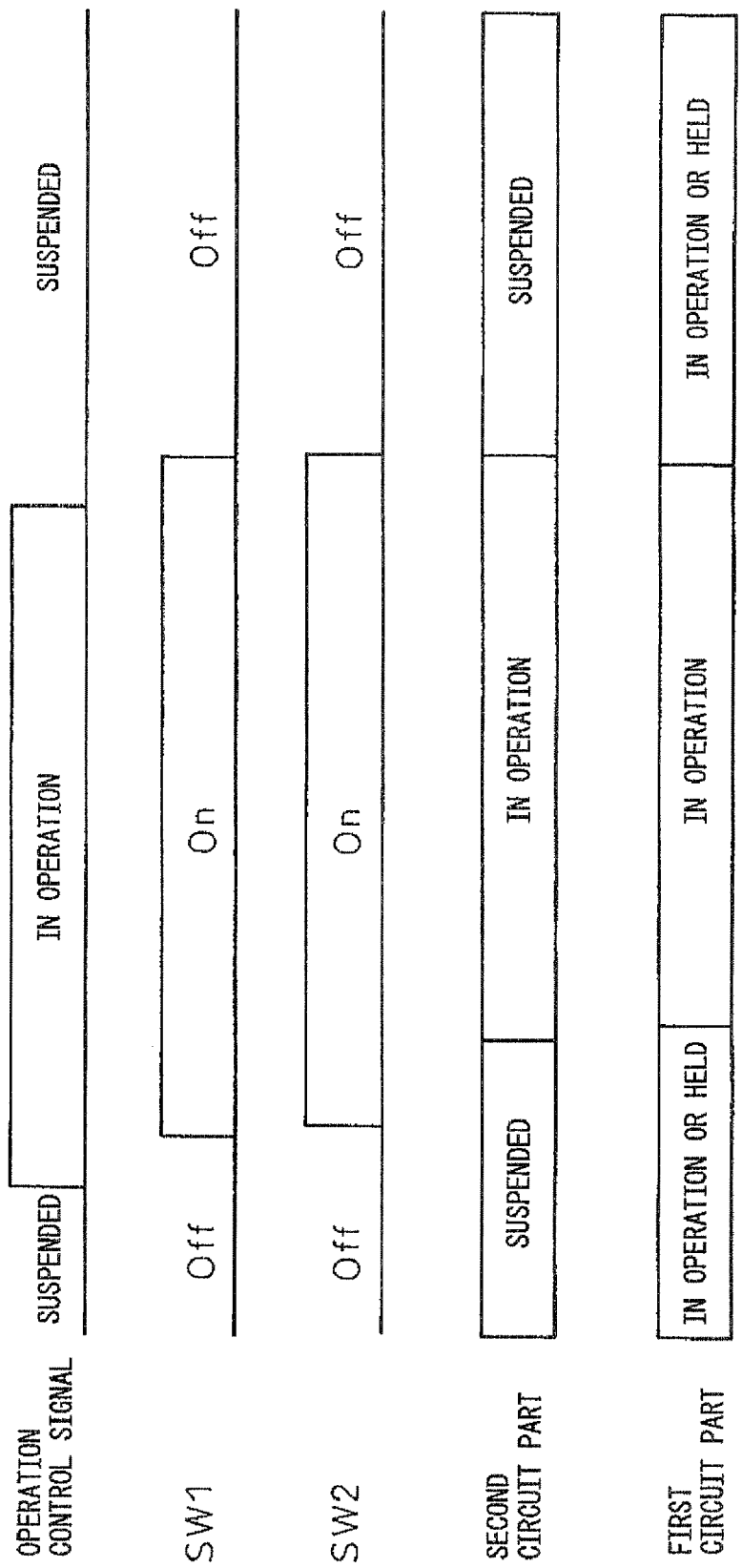
FIG. 8 is an operation time chart of the system in the first embodiment.

FIG. 7 is a flowchart showing the control operation of the supply of power source to image processing LSI in the electronic device system in the first embodiment. FIG. 8 is a time chart corresponding to the operation in FIG. 7.

During the period of standby in which image processing is not carried out, that is, the image processing control signal is in the suspended state, second circuit part 28 of image processing LSI 26 does not need to operate, and therefore, SW1 and SW2 are opened and the supply of power source is terminated. Due to this, the power consumption is reduced. On the other hand, first circuit part 7 has a decryption key necessary to decode encrypted data and therefore the power source is always supplied in order to hold the data. This state is called the operating or holding state.

In step S201, whether an OS running on CPU 1 issues an image processing command by the instruction of the program is monitored and when an image processing command is issued, the procedure proceeds to step S205 and when no image processing command is issued, the procedure proceeds to step S204.

On the other hand, the image processing is also activated by the operation of a user not only by the instruction of the program. It is assumed that a user presses the button of operation part 4 to activate an operation that requires image processing, for example, the operation to cause the display device of the system to display image data while image processing LSI 26 is in the standby state in step S202. In step S203, operation part 4 sends an interrupt control signal to CPU 1 to execute the image processing program. In step S204, whether or not an interrupt control signal exists is determined and if not, the procedure returns to step S201 and if an interrupt control signal exists, the procedure proceeds to step S205.

In step S205, a certain value is written to the register of CPU 1. Due to this, the image processing control signal enters the operating state and a series of operation flows is activated. After step S205, the procedure proceeds to step S206.

In step S206, CPU 1 outputs a control signal to close SW1 and SW2 and thus SW1 and SW2 close, that it, the ON state is brought about. Due to this, second circuit part 28 changes from the suspended state into the operating state. First circuit part 27 enters a state in which a power source is supplied also from second power source line 34 via switch SW2, that is, the operating state in which the access operation may be done normally.

In step S207, CPU 1 sends image data to be processed and the processing program from memory 2 to image processing LSI 26. The image data is stored in first circuit part 27 and there may be a case where and part of the processing program is stored in first circuit part 27. In step S208, image processing LSI 26 carries out the decode processing of the image data in second circuit part 28 according to the processing program that is sent. At this time, the image data stored in first circuit part 27 is read and the processed data is stored in first circuit part 27. In step S209, image processing LSI 26 sends out the processed data to memory 2 via CPU 1. CPU 1 displays an image on display part 3 by writing the processed data. In step S210, after having completed the processing given, image processing LSI 26 sends a control signal to the effect that the processing is completed to CPU 1. In step S211, CPU 1 opens SW1 and SW2 and electrically disconnects the power source of second circuit part 28. Due to this, the operation control signal enters the suspended state, SW1 and SW2 enter the OFF state, second circuit part 28 enters the suspended state, and first circuit part 27 enters the operating or holding state. Then, the procedure returns to step S201 and the state of awaiting an operation of a user and the state of awaiting an instruction of image processing command are returned. At this time, a power source is supplied to first circuit part 27, the data stored in first circuit part 27 is held, and the timer etc. is in the operating state.

FIG. 9 is a diagram explaining the effect of the electronic device system in the first embodiment. As in FIG. 2, a simulation was conducted on the assumption that the ratio of the number of electrode pads of first power source line 33 of first circuit part 27 and that of second power source line 34 of second circuit part 28 is 1:2, power source inductances L1 and L2 of first circuit part 7 and second circuit part 8 are 1.2 nH and 0.6 nH, respectively, and second circuit part 8 has a capacitance of 50 nF as drive load C2 and operates at 1.2 V. As shown in FIG. 9(B), the result is that the voltage drop of power source voltage VA of first circuit part 27 is 80 mV, considerably smaller than the voltage drop of 0.3 V shown in FIG. 2(B).

The first embodiment in FIG. 9 differs from the conventional example in FIG. 2 in that SW2 is installed and SW2 is closed when first circuit part 27 accesses the SRAM. When second circuit part 28 in the operating state accesses the SRAM of first circuit part 27, a peak-shaped large current flows through first circuit part 27 and this may be thought because SW1 and SW2 are closed at this time and charges are refilled from the capacitor element having a capacitance of 50 nF, which is the drive load of second circuit part 28, through SW2 when the SRAM operates, and therefore, the voltage drop of the power source of first circuit part 27 is reduced to 80 mV and the amount of noise is reduced by 73%.

Here, the difference between the embodiment and the above-mentioned patent documents 1 and 2 is explained. The difference lies in the control method of the switches. In patent documents 1 and 2, the switch between the power source lines is opened during the period of normal operation and the switch is closed at the time of test or application of a voltage exceeding the rating, such as a surge, but in the embodiment, switch SW2 is closed during the period of normal operation and opened in the standby state, an opposite control method. Because of this, in the normal state in which the rated voltage is applied, the switch between the power source lines is in the nonconductive state and therefore if the SRAM of the first circuit part is accessed, the power source voltage drops and the correct reading/writing of data may be no longer possible.

Figure 10:
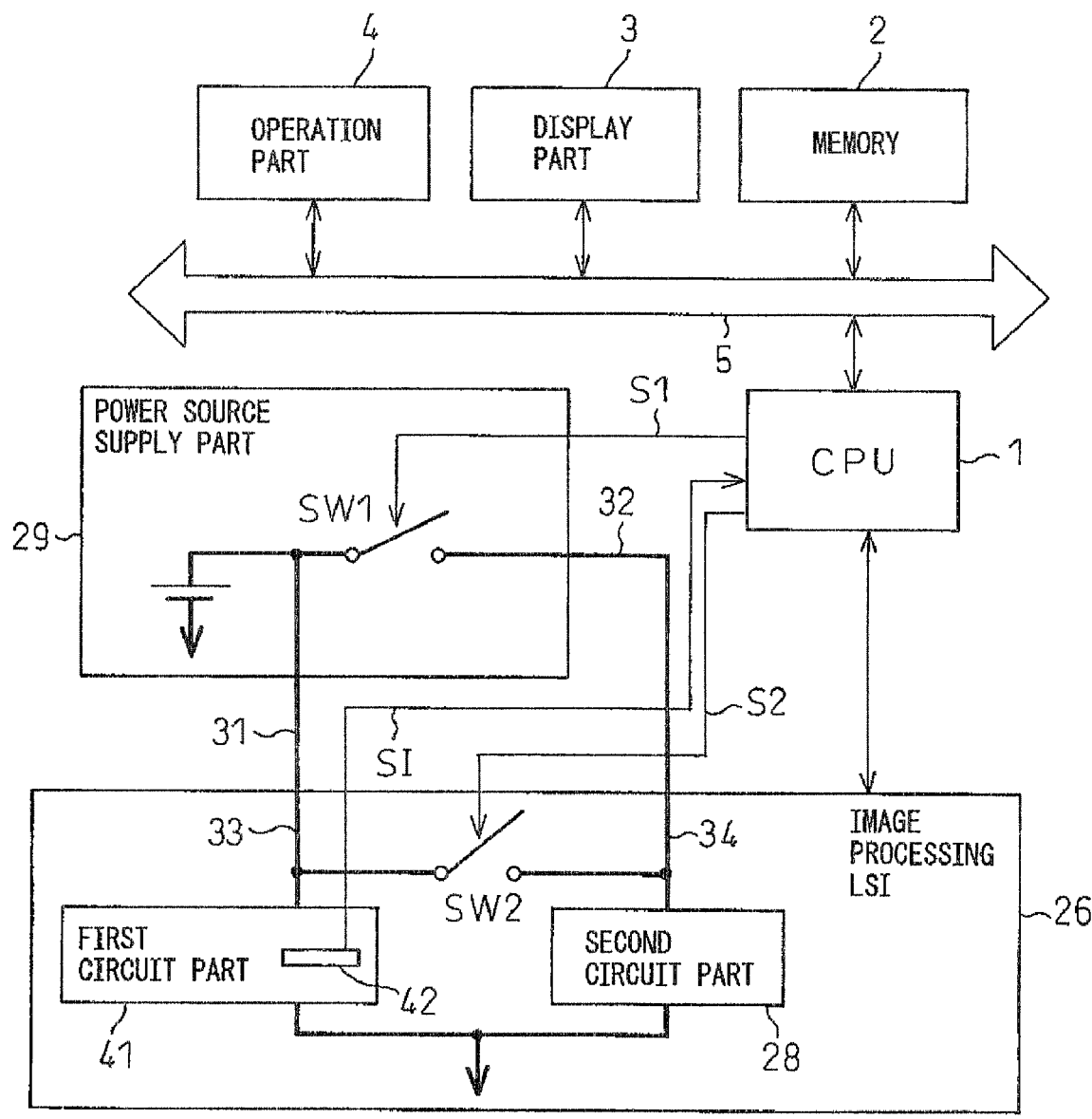
FIG. 10 is a diagram showing a configuration of an electronic device system in a second embodiment.

FIG. 10 is a diagram showing a configuration of an electronic device system in a second embodiment. The second embodiment differs from the first embodiment in that a register 44 is provided in a first circuit part 42 of an image processing LSI 41 and data of register 44 is notified to CPU 1 as a control signal S1, and other parts are the same as those in the first embodiment. Consequently, only the different parts are explained.

In the second embodiment, the opening/closing of switches SW1 and SW2 is controlled by the data value of register 42. It is assumed that first circuit part 41 includes, for example, a timer circuit for measuring time and image processing LSI 26 operates at predetermined intervals according to its specifications. The timer circuit of first circuit part 41 writes predetermined data, for example, 1, to register 42 after a predetermined time elapses and sends the value to CPU 1 as control signal S1. When control signal S1 becomes 1, CPU 1 activates image processing.

Figure 11:
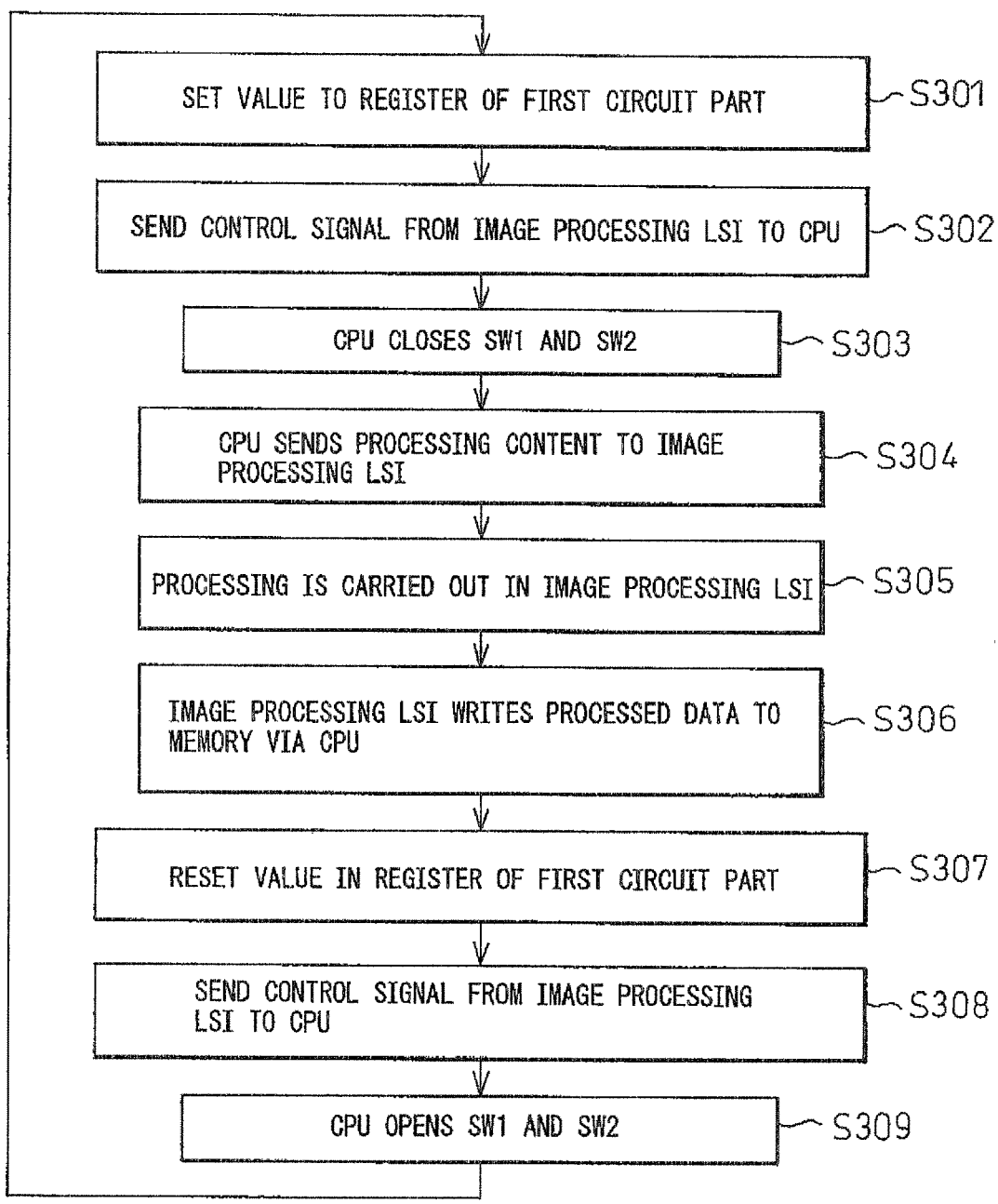
FIG. 11 is a flowchart showing the operation in the second embodiment.

FIG. 11 is a flowchart showing the control operation of the supply of power source to the image processing LSI in the electronic device system in the second embodiment.

In step 301, a value is set to register 42 of first circuit part 41. In step S302, control signal S1 is sent from image processing LSI 26 to CPU 1. In response to this, CPU 1 activates image processing. Steps S303 to S306 are the same as steps S206 to S209 in FIG. 7.

In step S307, the value of register 42 of first circuit part 41 is reset. Steps S308 and S309 are the same as steps S210 and S211 in FIG. 7.

Figure 12:
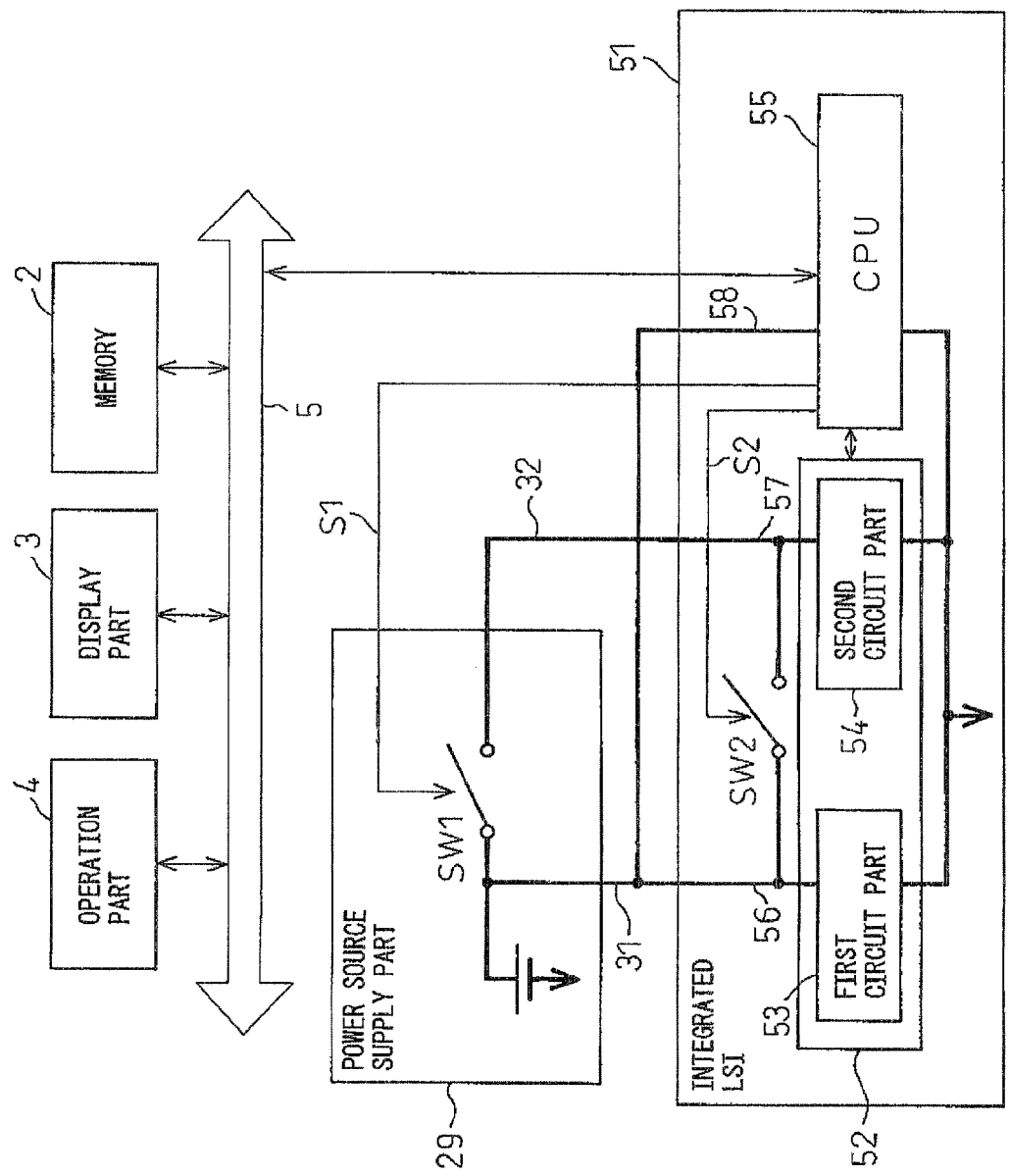
FIG. 12 is a diagram showing a configuration of an electronic device system in a third embodiment.

FIG. 12 is a diagram showing a configuration of an electronic device system in a third embodiment. In the first embodiment, CPU 1 and the image processing LSI are mounted on different chips, however, the third embodiment differs from the first embodiment in that a CPU 55 and an image processing part 52 are mounted on an integrated LSI 51. A power source is supplied to CPU 55 via first external power source line 31 that supplies a power source to first circuit part 52 and a third power source line 58 within integrated LSI 51. In the configuration of the third embodiment, control signal S2 that controls the opening/closing of SW2 according to CPU 55 is realized via a wiring line within integrated LSI 51. Due to this, the number of chips and the number of control wiring lines between chips may be reduced and therefore it may be possible to obtain the same effect of reduction in noise amount.

Figure 13:
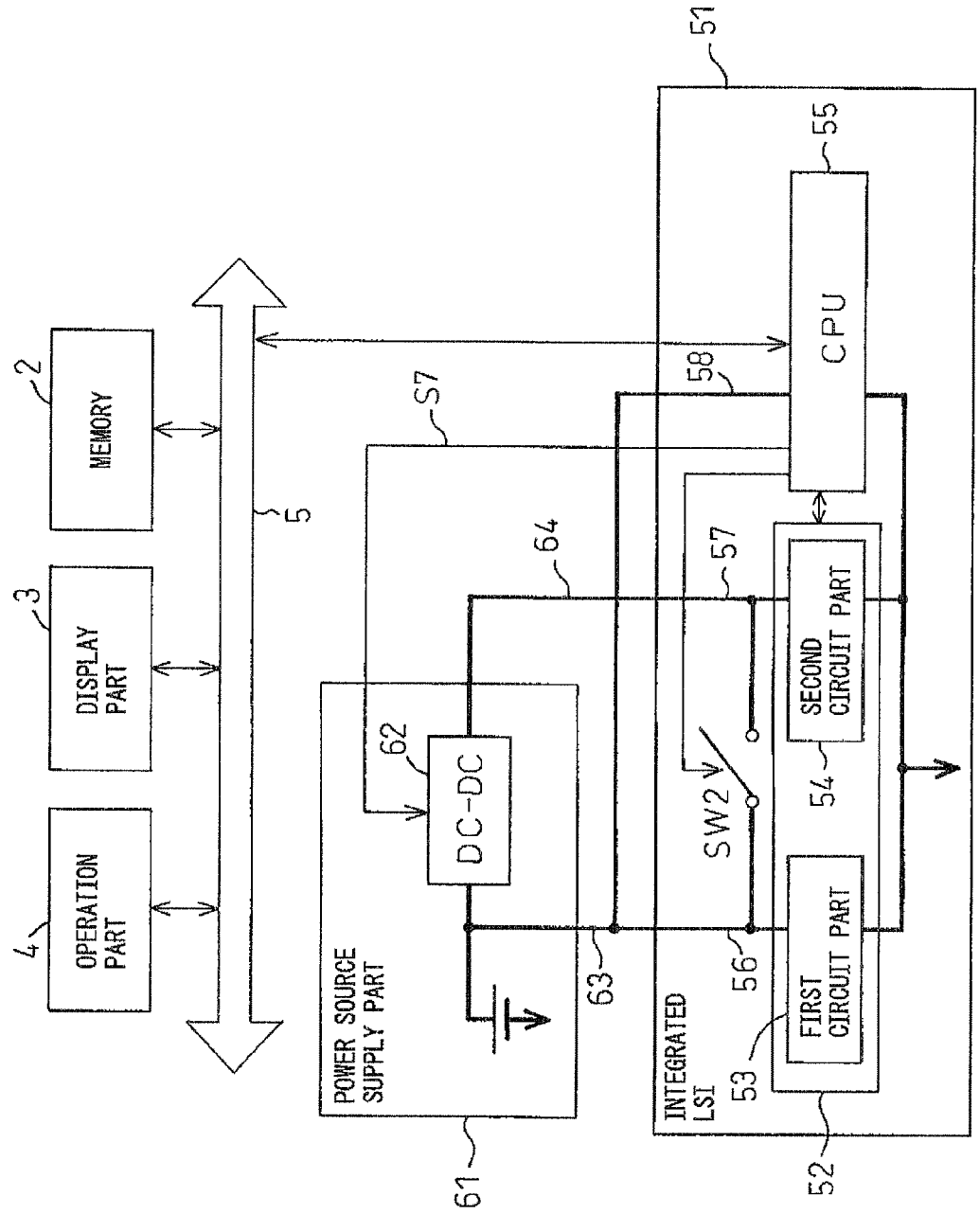
FIG. 13 is a diagram showing a configuration of an electronic device system in a fourth embodiment.

FIG. 13 is a diagram showing a configuration of an electronic device system in a fourth embodiment. The electronic device system in the fourth embodiment differs from the electronic device system in the third embodiment in that a DC-DC converter 62 is used instead of switch SW1. That is, the difference lies in that a power source supply part 61 having DC-DC converter 62 is used. In the fourth embodiment, a first circuit part 53 is a logic circuit for image processing etc. A second circuit part 54 includes a memory that saves a decryption key necessary to decode encrypted data, a storage circuit, such as a flip-flop, a timer circuit, etc., and in the standby state in which no access is made to the memory, the voltage of power source to be supplied may be reduced and by reducing the voltage of power source to be supplied, the consumption power may be reduced by reducing the leak current while holding data in the storage circuit. On the other hand, when access is made, the voltage of power source to be supplied to second circuit par 54 is raised to enable a high-speed operation.

DC-DC converter 62 inputs a direct current (DC) voltage and outputs a DC voltage and may vary the value of output voltage according to a control signal S7 from CPU 55. In the standby state, a power source is supplied to second circuit part 54; however, the value of voltage is set to a value less than the value of voltage supplied to first circuit part 53. When access is made to the SRAM of second circuit part 54, DC-DC converter 62 outputs the same voltage as that of the power source to be supplied to first circuit part 53 and CPU 55 according to control signal S7. In this state, if the SRAM of second circuit part 54 is accessed, a peak-shaped large current flows, however, a second power source line 57 is coupled to a first power source line 56 via switch SW2, and therefore, the power source noises may be reduced.

Figure 14:
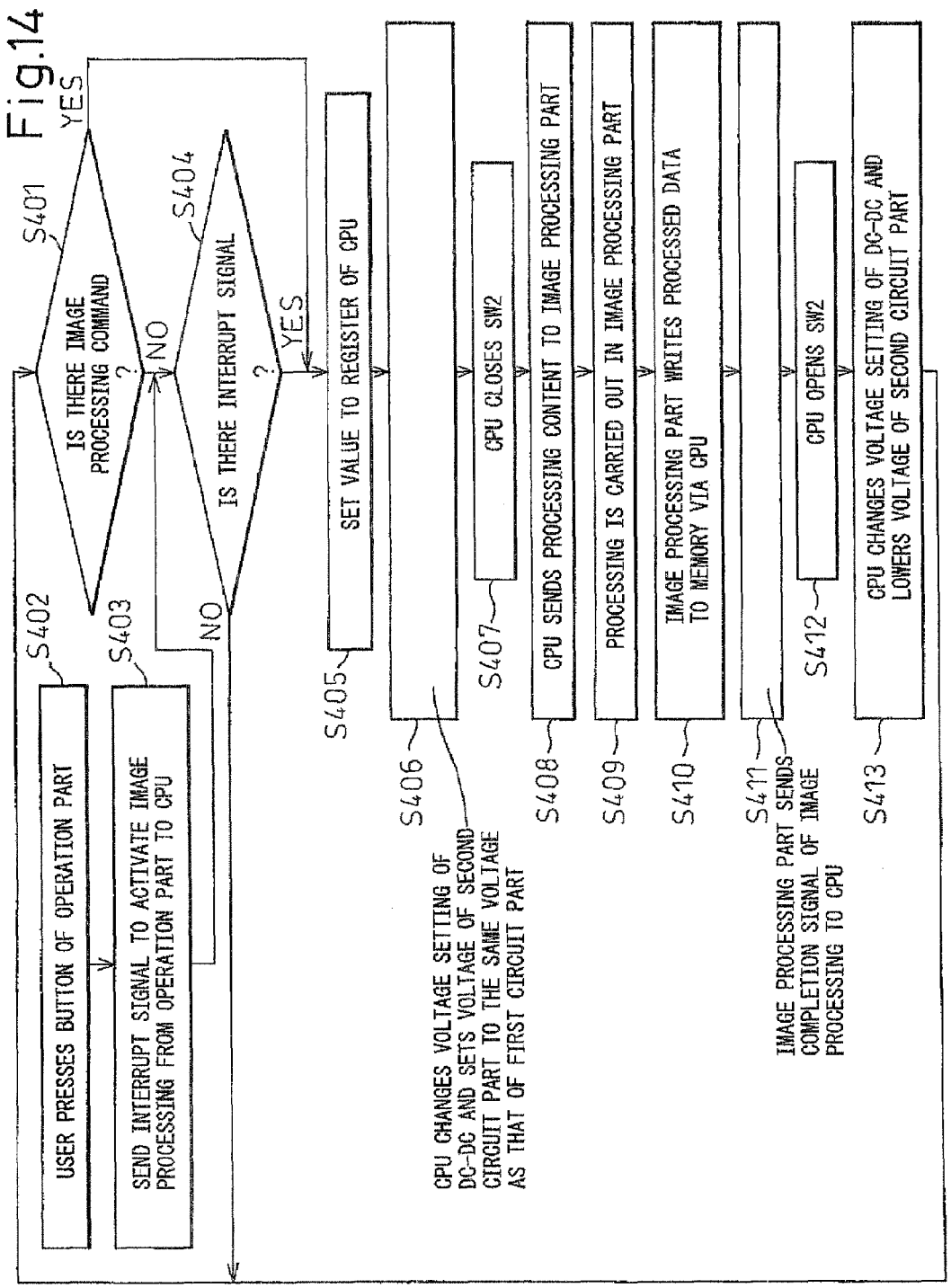
FIG. 14 is a flowchart showing the operation in the fourth embodiment.

FIG. 14 is a flowchart showing the control operation of the supply of power source to the image processing LSI in the electronic device system in the fourth embodiment.

Steps S401 to S405 are the same as those in the flowchart in the first embodiment in FIG. 7.

In step S406, CPU 55 changes the voltage setting of DC-DC converter 62 and makes the voltage of power source to be supplied to second circuit part 54 equal to the voltage of power source to be supplied to first circuit part 53.

Steps S407 to S412 are the same as steps S206 to S211 in FIG. 7.

In step S413, CPU 55 changes the voltage setting of DC-DC converter 62 and lowers the voltage of power source to be supplied to second circuit part 54 to put it into the standby state. Then, the procedure returns to step S401.

Figure 15:
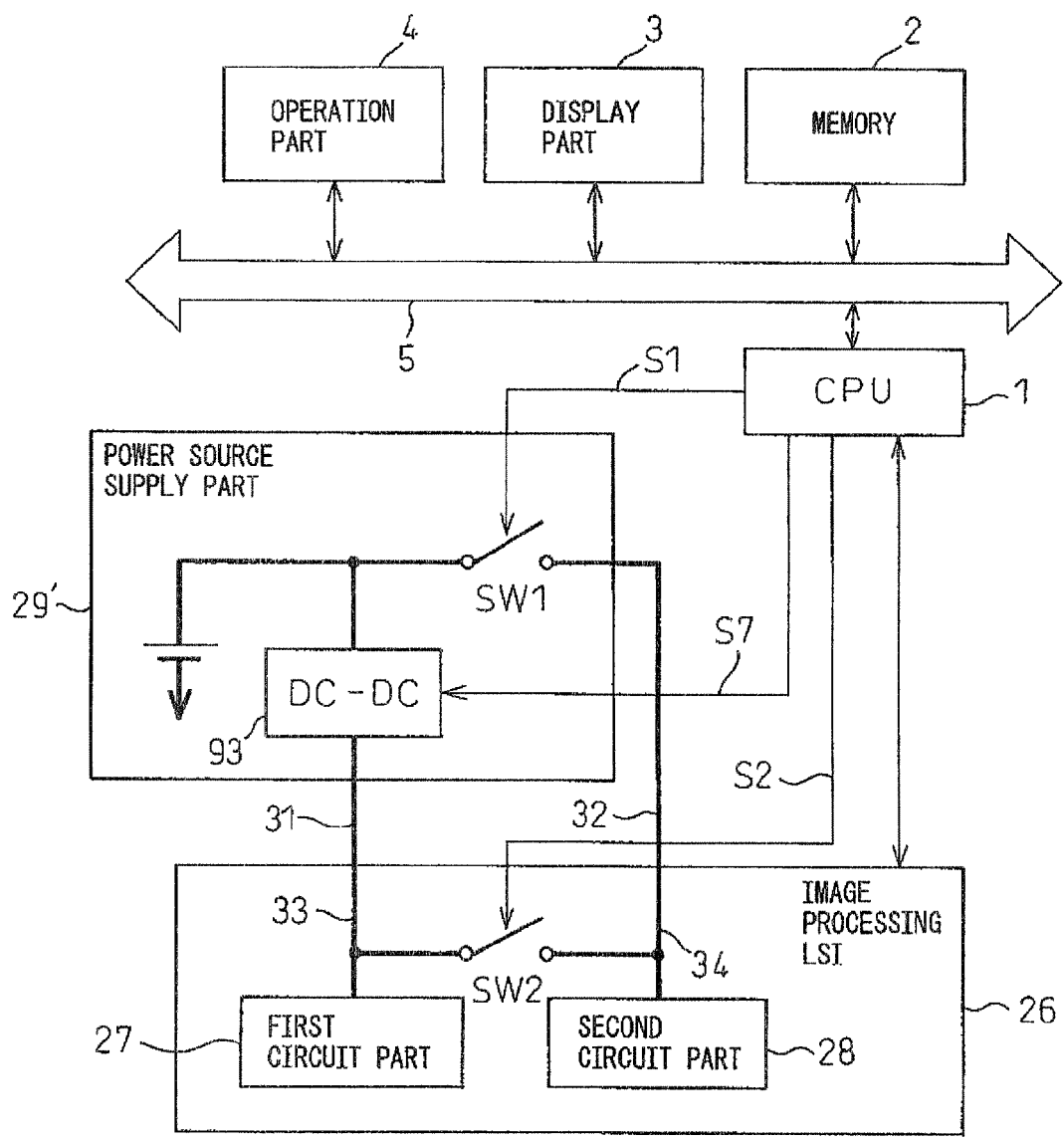
FIG. 15 is a diagram showing a configuration of an electronic device system in a fifth embodiment.

FIG. 15 is a diagram showing a configuration of an electronic device system in a fifth embodiment. The electronic device system in the fifth embodiment has a configuration in which a power source supply part 29' is provided with a DC-DC converter 93 that changes the voltage of power source to be supplied to first circuit part 27 in the electronic device system in the first embodiment. With this configuration, it may be possible to reduce the power consumption by lowering the voltage of power source to be supplied to first circuit part 27 in the standby state to a minimum level required to hold data as well as terminating the supply of power source to second circuit part 28 as in the first embodiment. It is also designed so that a power source is supplied to second circuit part 28 to put it into the operating state and when first circuit part 27 is accessed, DC-DC converter 93 is caused to output the same voltage as the voltage of power source to be supplied to second circuit part 28. Due to this, the same effect as that in the first embodiment may be obtained that the voltage drop resulting from the occurrence of a peak current at first circuit part 27 is reduced.

Figure 16:
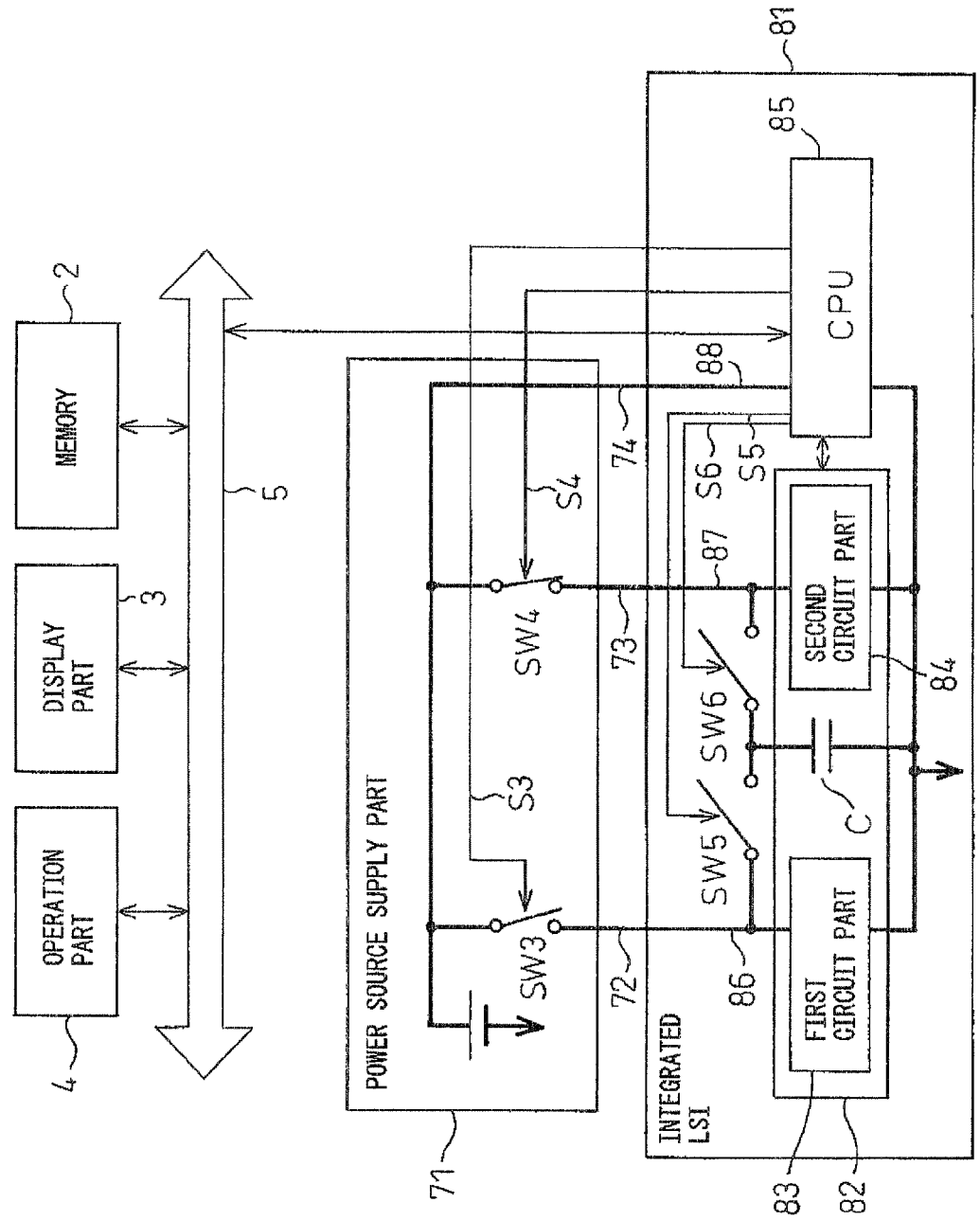
FIG. 16 is a diagram showing a configuration of an electronic device system in a sixth embodiment.

FIG. 16 is a diagram showing a configuration of an electronic device system in a sixth embodiment. As shown in FIG. 16, the electronic device system in the sixth embodiment has an integrated LSI 81, memory 2, display part 3, operation part 4, bus 5 that couples these components, and a power source supply part 71 that supplies a power source to integrated LSI 81. Integrated LSI 81 is provided with a CPU 85 and an image processing part 82. Image processing part 82 is provided with a first circuit part 83, a second circuit part 84, and capacitor C. Further, integrated LSI 81 is provided with switch SW5 that couples a first power source line 86 of first circuit part 83 and capacitor C, and switch SW6 that couples a first power source line 87 of second circuit part 87 and capacitor C.

Power source supply part 71 is provided with a part that generates a power source to be supplied to CPU 85, first circuit part 83, and second circuit part 84 of integrated LSI 81, switch SW3 that controls the supply of power source to first circuit part 83, and switch SW4 that controls the supply of power source to second circuit part 84. Switches SW3 to SW6 are controlled to turn on/off by control signals S3 to S6. A power source is always supplied to CPU 85.

FIG. 17 is a flowchart showing the operation of the electronic device system in the sixth embodiment.

CPU 1 is always in the operating state. In step S501, whether there is a request to activate first circuit part 83 or second circuit part 84 is monitored. When an activation request is issued, the procedure proceeds to step S502 and which circuit is requested to be activated is determined. In this case, the activation requests include three activation requests, that is, an activation request for only first circuit part 83, an activation request for only second circuit part 84, and an activation request for both first circuit part 83 and second circuit part 84.

In the case of the activation request for only first circuit part 83, the procedure proceeds to step S511, where SW3 and SW5 are closed, and in step S512, the processing in first circuit part is carried out. When an end signal is received from the first circuit part in step S513, SW3 and SW5 are opened in step S514 and the procedure returns to step S501.

In the case of the activation request only for second circuit part 84, the procedure proceeds to step S521, where SW4 and SW6 are closed and in step S522, the processing in second circuit part 84 is carried out. When an end signal is received from the second circuit part in step S523, SW4 and SW6 are opened in step S524 and the procedure returns to step S501.

In the case of the activation request for both first circuit part 83 and second circuit part 84, the procedure proceeds to step S531, where SW3 to SW6 are closed and in step S532, the processing in first circuit part 83 and second circuit part 84 is carried out. When an end signal is received from first circuit part 83 and the second circuit part in step S533, SW3 to SW6 are opened in step S534 and the procedure returns to step S501.

With the configuration in the sixth embodiment, because the power source line of the circuit part in operation is coupled to capacitor element C, the effect to reduce power source noises may be obtained. Further, during period of standby, the power source line is electrically disconnected from the capacitor element, and therefore, it may be possible to reduce the leak current that occurs in the capacitor element.

As above, the embodiments are explained, however, it is obvious that the configuration of each embodiment may be combined with other embodiments. For example, the configuration of the power source wiring in the first embodiment may be applied to other embodiments.

A person in the art will understand that there may be various modifications other than those explained above. For example, in the above-mentioned embodiments, the storage circuit, such as a memory mounted on the image processing LSI, and the logic circuit part are explained as an example, however, the present invention is not limited to this.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

Numbers applying embodiments (first, second or third etc.) do not show priorities of the embodiments. Many variations and modifications will be apparent to those skilled in the art.

What is claimed is:

1. An electronic device comprising:
an integrated circuit comprising a first circuit part, a second circuit part, a first power source line of the first circuit part, a second power source line of the second circuit part, and a coupling switch that connects the first power source line and the second power source line;
a power source supply part that generates and outputs a power source to be supplied to the first and second circuit parts of the integrated circuit, and which comprises a power source supply control circuit that controls the supply of power source to the second circuit part; and
a power source control part that controls the power source supply control circuit and the coupling switch,
wherein the power source control part controls the power source supply control circuit so as to supply a power source in accordance with the operating state of the second circuit part, and closes the coupling switch.

2. The electronic device according to claim 1,
wherein the power source supply control circuit is a switch.

3. The electronic device according to claim 2,
wherein the power source control part controls the power source supply control circuit so as to supply a power source when putting the second circuit part into the operating state, and controls the power source supply control circuit so as not to supply a power source when putting the second circuit part into the suspended state.

4. The electronic device according to claim 3,
wherein the power source control part controls the coupling switch so as to close when putting the second circuit part into the operating state, and controls the coupling switch so as to open when putting the second circuit part into the suspended state.

5. The electronic device according to claim 2,
wherein: the first circuit part comprises a register that holds a control value of the operating state of the second circuit part; and
the power source control part controls the power source supply control circuit and the coupling switch in accordance with the control value of the register.

6. The electronic device according to claim 2,
wherein: the power source supply part comprises a DC-DC converter that controls the voltage of power source to be supplied to the first circuit part;
the power source control part controls the voltage of power source output from the DC-DC converter; and
the DC-DC converter controls so as to supply a power source the voltage of which is the same as the voltage to be supplied to the second circuit from the DC-DC converter when closing the coupling switch.

7. The electronic device according to claim 1,
wherein: the power source supply control circuit is a DC-DC converter; and
the DC-DC converter varies the voltage to output in accordance with the control by the power source supply control part.

8. The electronic device according to claim 7,
wherein the power source supply control part controls to output a power source the voltage of which is the same as the voltage to be supplied to the first circuit from the DC-DC converter when closing the coupling switch.

9. The electronic device according to claim 1, wherein the power source supply control part is provided within the integrated circuit.

10. An electronic device comprising:

an integrated circuit comprising a first circuit part, a second circuit part, a first power source line of the first circuit part, a second power source line of the second circuit part, a power source capacitor, a first coupling switch that couples the first power source line and the power source capacitor, and a second coupling switch that couples the second power source line and the power source capacitor;

a power source supply part that generates and outputs a power source to be supplied to the first and second circuit parts of the integrated circuit, and which comprises a first power source supply switch that controls the supply of power source to the first circuit part and a second power source supply switch that controls the supply of power source to the second circuit part; and a power source control part that controls the first power source supply switch, the second power source supply switch, the first coupling switch, and the second coupling switch, wherein the power source control part:

closes the first power source supply switch and the first coupling switch, and opens the second power source supply switch and the second coupling switch when putting the first circuit part into the operating state;

closes the second power source supply switch and the second coupling switch and, opens the first power source supply switch and the first coupling switch when putting the second circuit part into the operating state.

* * * * *

UNITED STATES PATENT AND TRADEMARK OFFICE
CERTIFICATE OF CORRECTION

| | |
|---|---|
| PATENT NO. | : 7,696,815 B2 |
| APPLICATION NO. | : 12/273927 |
| DATED | : April 13, 2010 |
| INVENTOR(S) | : Tetsuyoshi Shiota |

Page 1 of 1

It is certified that error appears in the above-identified patent and that said Letters Patent is hereby corrected as shown below:

Title Page:

In (63) Please correct the Related U.S. Application Data information as follows:

(63) Continuation of application No. PCT/JP2006/311018, filed on Jun. 1, 2006

Signed and Sealed this
Twenty-second Day of February, 2011

David J. Kappos
*Director of the United States Patent and Trademark Office*